(12) United States Patent
Olstad et al.

(10) Patent No.: US 6,947,956 B2
(45) Date of Patent: Sep. 20, 2005

(54) METHOD AND APPARATUS FOR SELECTIVE CACHING OF TRANSACTIONS IN A COMPUTER SYSTEM

(75) Inventors: Chad Allen Olstad, Rochester, MN (US); Gary Ross Ricard, Chatfield, MN (US); Adam Thomas Stallman, Rochester, MN (US); Larry William Youngren, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 453 days.

(21) Appl. No.: 10/164,200

(22) Filed: Jun. 6, 2002

(65) Prior Publication Data

US 2003/0229650 A1 Dec. 11, 2003

(51) Int. Cl.[7] .............................................. G06F 17/30
(52) U.S. Cl. ..................................... 707/200; 711/159
(58) Field of Search ............................... 711/113, 114, 711/159; 707/200

(56) References Cited

U.S. PATENT DOCUMENTS 4,228,501 A * 10/1980 Frissell ........................ 710/60
4,425,615 A * 1/1984 Swenson et al. ............ 711/114
5,574,897 A    11/1996 Hermsmeier et al.
5,625,820 A     4/1997 Hermsmeier et al.
5,991,835 A * 11/1999 Mashimo et al. ............. 710/58

OTHER PUBLICATIONS

U.S. Appl. No. 10/074,889, "Method and Apparatus for Data Recovery Optimization in a Logically Partitioned Computer System," filed Oct. 29, 2001.

* cited by examiner

Primary Examiner—Pierre Bataille
Assistant Examiner—Sheng-Jen Tsai
(74) Attorney, Agent, or Firm—Roy W. Truelson

(57) ABSTRACT

A database manager selectively caches journal entries for certain database changes based on dynamic selection criteria. Preferably, a journal disk drive is provided for storing changes to the database. Database change entries are sequentially cached in a main memory journal buffer, awaiting journal write. When a buffer is filled, its buffer contents are written to the journal disk. However, certain change operations will cause the contents of the buffer to be written to the journal disk immediately, before filling the buffer. Certain database change entries selectively cause the buffer to be written, depending on dynamic selection criteria. Preferably, these selection criteria take into account both the estimated time to recover in the event of a system crash and the current level of activity on the system. Generally, the busier the system, the more data will be cached, and vice versa.

17 Claims, 7 Drawing Sheets

METHOD AND APPARATUS FOR SELECTIVE CACHING OF TRANSACTIONS IN A COMPUTER SYSTEM

FIELD OF THE INVENTION

The present invention relates generally to digital data processing, and more particularly to database management in a digital computer system.

BACKGROUND OF THE INVENTION

A modem computer system typically comprises a central processing unit (CPU) and supporting hardware necessary to store, retrieve and transfer information, such as communications busses and memory. It also includes hardware necessary to communicate with the outside world, such as input/output controllers or storage controllers, and devices attached thereto such as keyboards, monitors, tape drives, disk drives, communication lines coupled to a network, etc. The CPU is the heart of the system. It executes the instructions which comprise a computer program and directs the operation of the other system components.

From the standpoint of the computer's hardware, most systems operate in fundamentally the same manner. Processors are capable of performing a limited set of very simple operations, such as arithmetic, logical comparisons, and movement of data from one location to another. But each operation is performed very quickly. Programs which direct a computer to perform massive numbers of these simple operations give the illusion that the computer is doing something sophisticated. What is perceived by the user as a new or improved capability of a computer system is made possible by performing essentially the same set of very simple operations, but doing it much faster. Therefore continuing improvements to computer systems require that these systems be made ever faster.

A computer system is a very complex machine having numerous components which interact with each other. While the CPU is the driving engine, the overall speed, or throughput, of the system can be affected by various other components, which either cause the CPU to wait or impose additional workload on the CPU. E.g., where the CPU needs data from memory, it may have to wait several cycles to access memory. Where the CPU needs data which is not in memory but is stored on a storage device, such as a hard disk drive, it executes operating system functions to access the data in storage, and the operating system often switches execution to another task or thread while waiting for the data from storage. These operations, although they do not necessarily cause the CPU to be idle, impose additional workload on the CPU which can affect system performance. They also introduce delay which may cause a human interacting with a computer to wait longer for a response.

Many large computer systems are used primarily or substantially to support database applications. A database application is a program which organizes, accesses and maintains a large pool of data. Typically, the database application services requests from multiple users to access small pieces of information in the database, either for purposes of reading them or updating them. These accesses do not necessarily occur in any sequential order, and may appear to be scattered to random portions of the database. Because the database is usually very large, it is generally impractical to keep the entire database, or even a major portion of it, in main memory at all times. Therefore a database application is usually characterized by a large number of storage access operations, most of which individually are small, and which are scattered among the storage addresses of the system. Under these conditions, the performance of the computer system is heavily dependent on the collective performance of the storage device(s).

Faster storage hardware will in many cases improve the performance of computer systems used for servicing large databases, but for a given set of storage hardware characteristics, it is further possible to improve performance by either reducing the number of storage access operations, or by performing some operations when the storage hardware is less busy, or by more efficiently utilizing the available storage hardware.

One well-known technique for supporting database changes is journaling. Journaling involves writing the change operations sequentially to a special storage device or devices, or special portion of a storage device. Journaling doesn't reduce the number of storage operations performed, but operates on the principle that the storage hardware is more efficiently used. Specifically, the typical storage device is the rotating magnetic disk drive. For small, random accesses to a disk drive, most of the time required to access data will be devoted to seeking to a track (a seek) and waiting for the disk to rotate to the desired angular position (latency). If, however, data is always written sequentially (to the next sector or track), then these seek and latency times are virtually eliminated, and the same amount of data can be written in a much smaller time interval. Unfortunately, sequential writing means that the data in the journal is not organized according to the organizational structure of the database. Therefore, journaling only amounts to saving the data temporarily on a non-volatile storage device. Ultimately, the same data updates must be performed on the organized data (original copy) in storage, which generally means many small write operations. Changed data is typically kept in memory until an update to the original copy in nonvolatile storage ensues. This update is performed from data in memory, since journalled data is organized in a different fashion. Keeping journal data in memory longer may reduce the total number of write accesses to the original copy of the journal data on disk, because a memory page housing consecutive journal data may be updated multiple times before the ultimate write to storage is performed. In other cases, this delayed buffering may allow the storage write operation to be executed at a time when the storage device has become less busy, or may allow multiple write operations to be combined, or other forms of efficiency improvement to the storage write operation.

One of the design goals of many large modem computer systems is data preservation or redundancy, i.e., data should not be lost as a result of a system malfunction (whether due to an external cause such as loss of power or an internal cause such as a component failure) Another design goal is availability, i.e., that the system be available to users as much as possible. In some cases, there is a need for constant availability, i.e., the system must be designed so that it is always available, come what may. In other systems, some amount of down time, or some amount of time when the system operates at reduced performance, may be acceptable.

In general, there is some trade-off between data preservation and availability on the one hand and maximum utilization of hardware resources for productive work on the other. Journaling is one example of this maxim. The journal enhances data preservation and availability by saving data in a non-volatile location pending a write of changed data to structured non-volatile storage, but journaling itself requires hardware resources in the form of storage devices and supporting hardware, and may consume portions of the available bandwidth of other resources, such as buses, channels and processors. As another example of this maxim, it is well known to store data in a redundant fashion on multiple storage devices in any of various schemes known as "RAID", meaning "redundant array of independent disks", but all of these schemes sacrifice some of the storage capacity of the disks in order to achieve redundancy, and in some cases may adversely affect storage access times when compared with non-redundant storage schemes.

There are further design trade-offs in the way in which a journal is implemented. If every database change entry is written immediately to the journal disk, the journal is burdened with a large number of small write operations. Typically, some journal change entries are buffered or cached in memory, so that multiple entries are written at a time to the journal. The greater the number of entries which are cached before writing to the journal, the fewer the number of writes and consequent impact on system performance. However, the longer one waits before writing the journal entries to nonvolatile storage, the more one reduces the journal's beneficial effects, i.e., more data is exposed.

A need exists, not necessarily recognized, for a means for managing these competing considerations so that a system achieves reasonable levels of performance, availability and data preservation.

SUMMARY OF THE INVENTION

A database manager selectively caches journal entries for certain database changes based on dynamic selection criteria. At least one of the selection criteria relates to the current level of performance of the system or some component thereof. In general, the busier the system, the more data will be cached, and vice versa. Hence, the performance burden of write operations to the journal is reduced when reduction is most needed, and is increased when the system is best able to tolerate it.

In the preferred embodiment, a journal disk storage device is provided for storing changes to the database. Database change entries are cached in a main memory journal buffer in sequential form, awaiting journal write. When a journal buffer is filled, the buffer contents are written to the journal disk. However, certain change operations will cause the contents of the buffer to be written to the journal disk immediately, without waiting for the buffer to fill. In some cases, a type of database change entry automatically causes the buffer to be written to the journal. Other database change entries selectively cause the buffer to be written, depending on dynamic selection criteria. Preferably, these selection criteria take into account both the estimated time to recover in the event of a system crash and the current level of activity on the system.

By selectively determining when to empty a journal buffer, the system is able to more frequently empty the buffer when it is not busy (thus reducing recovery time exposure), and less frequently empty the buffer when busier (thus reducing the performance burden of additional write operations when performance is most critical).

The details of the present invention, both as to its structure and operation, can best be understood in reference to the accompanying drawings, in which like reference numerals refer to like parts, and in which:

DETAILED DESCRIPTION OF THE PREFERRED EMBODIMENTS

Figure 1:
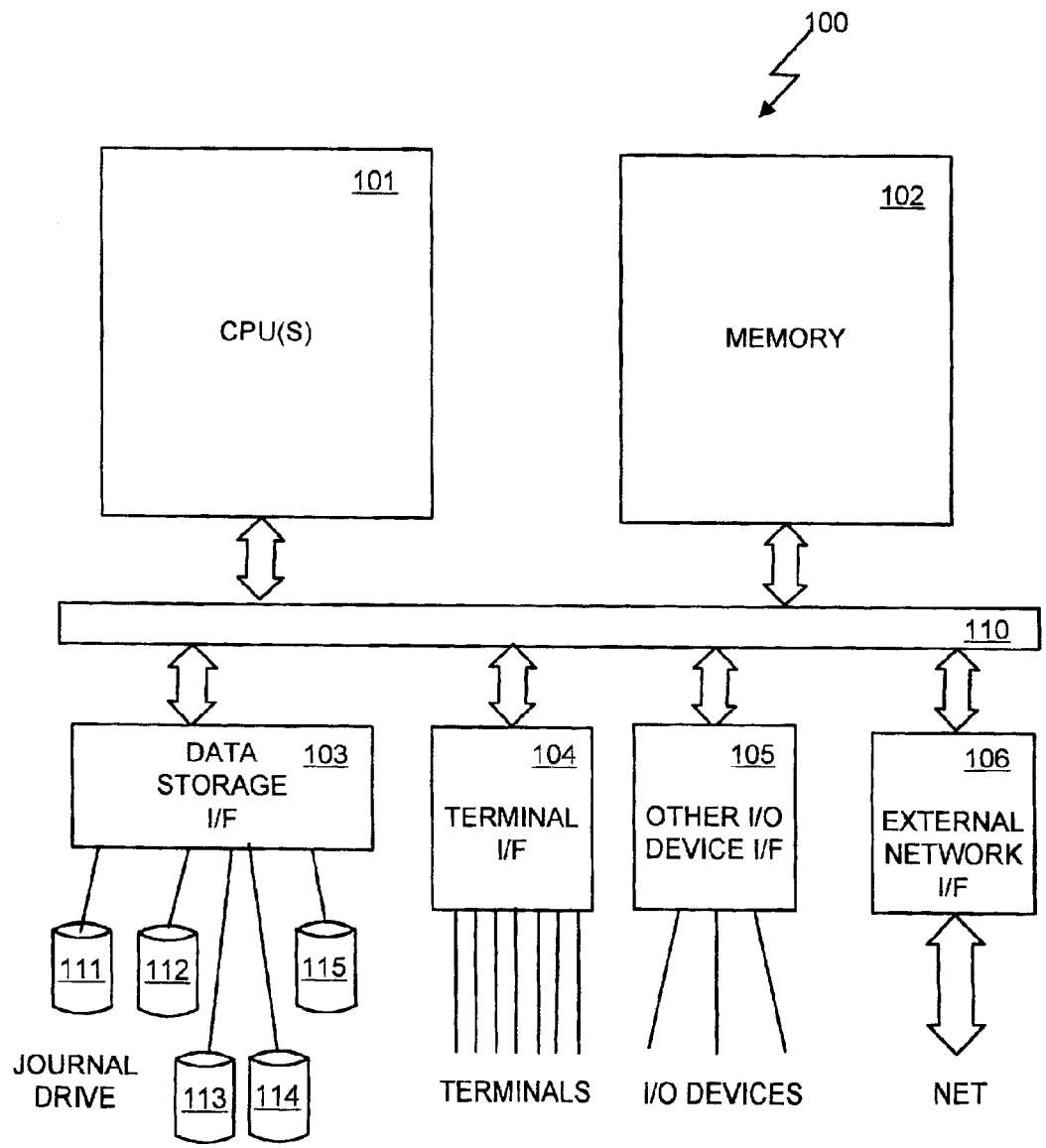
FIG. 1 is a high-level block diagram of the major hardware components of a computer system supporting database operations, according to the preferred embodiment of the invention described herein.

Referring to the Drawing, wherein like numbers denote like parts throughout the several views, FIG. 1 shows a high-level block diagram of a computer system 100 acting as a repository of database information, consistent with the preferred embodiment. Computer system 100 comprises one or more central processing unit (CPUs) 101, main memory 102, data storage interface 103, terminal interface 104, I/O device interface 105, and external network interface 106. The various devices communicate with each other via internal communications bus 110. CPU 101 is a general-purpose programmable processor, executing instructions stored in memory 102; while a single CPU is shown in FIG. 1, it should be understood that computer systems having multiple CPUs could be used. Memory 102 is a random-access volatile memory for storing data and programs; memory is shown conceptually as a single monolithic entity, it being understood that memory is often arranged in a hierarchy of caches and other memory devices, and that different caches may be associated with different CPUs of a multiple CPU system. Data storage interface 103 provides a connection to one or more data storage devices, which are preferably rotating magnetic hard disk drive units 111–115, although other types of data storage could be used. Terminal interface 104 provides a connection for transmission of data to and from one or more attached terminals or workstations. This may be implemented in a variety of ways. Many large computer systems (mainframes) support the direct attachment of multiple terminals through terminal interface I/O processors, usually on one or more electronic circuit cards. Alternatively, interface 104 may provide a connection to a local area network. Various other alternatives are possible. I/O device interface 105 provides connections to one or more I/O devices (other than storage, terminals, and external network). I/O devices could conceivably be any type of device attached to a computer system. Examples of such devices are printers, scanners, magnetic stripe readers, special-purpose sensors, servo controllers, switches, and so forth. External network interface 106 provides a physical connection for transmission of data to and from an external network, such as the Internet, and could use any of various available technologies. It is possible that clients performing database operations may be attached remotely through the Internet or other remote network connection. Communications bus 110 supports transfer of data, commands and other information between different devices; while shown in simplified form as a single bus, it is typically structured as multiple buses, and may be arranged in a hierarchical or other form. The computer system shown in FIG. 1 is intended to be a simplified representation for purposes of illustration, it being understood that many variations in system configuration are possible in addition to those specifically mentioned here. In particular, it should be understood that the number and type of devices may vary, and that storage interface 103, terminal interface 104, I/O device interface 105, and external network interface 106 may each be embodied in multiple functional hardware units, or may be combined in integrated multi-function units. Resources of computer system 100 may, but need not be, logically partitioned. While system 100 could conceivably be a single-user personal computer system, a large database is more typically supported on a larger, multi-user computer system. In the preferred embodiment, computer system 100 is a computer system based on the IBM AS/400 or e-Server I/Series architecture, it being understood that the present invention could be implemented on other computer systems.

In the illustration of FIG. 1 and for purposes of the description below, storage drive 111 represents a journal drive, while drives 112–115 represent drives used for general data storage, including in particular for storing one or more databases in a structured form. By "structured form", it is meant that the data has some type of organizational structure whereby a known database record can be accessed directly, without reading an unordered aggregation of records until the known record is found. The organizational structure of databases may vary widely, and some databases may have multiple indexes enabling the determination of a database record according to multiple different parameter values. While a single journal drive 111 and four general data drives 112–115 are illustrated in FIG. 1, it will be understood that the actual number of drives may vary, and in particular that there could be more than one journal drive. Furthermore, there could be additional drives for storing parity or other redundant data according to any of various redundant storage techniques commonly known as "RAID", or as "hot spare" drives for use in the event of a drive failure. It is also possible that one or more drives will have dual function, a portion of the storage area of such a dual function drive being used for a journal, while another portion is used for general data or some other function, such as a hot spare storage device.

Figure 2:
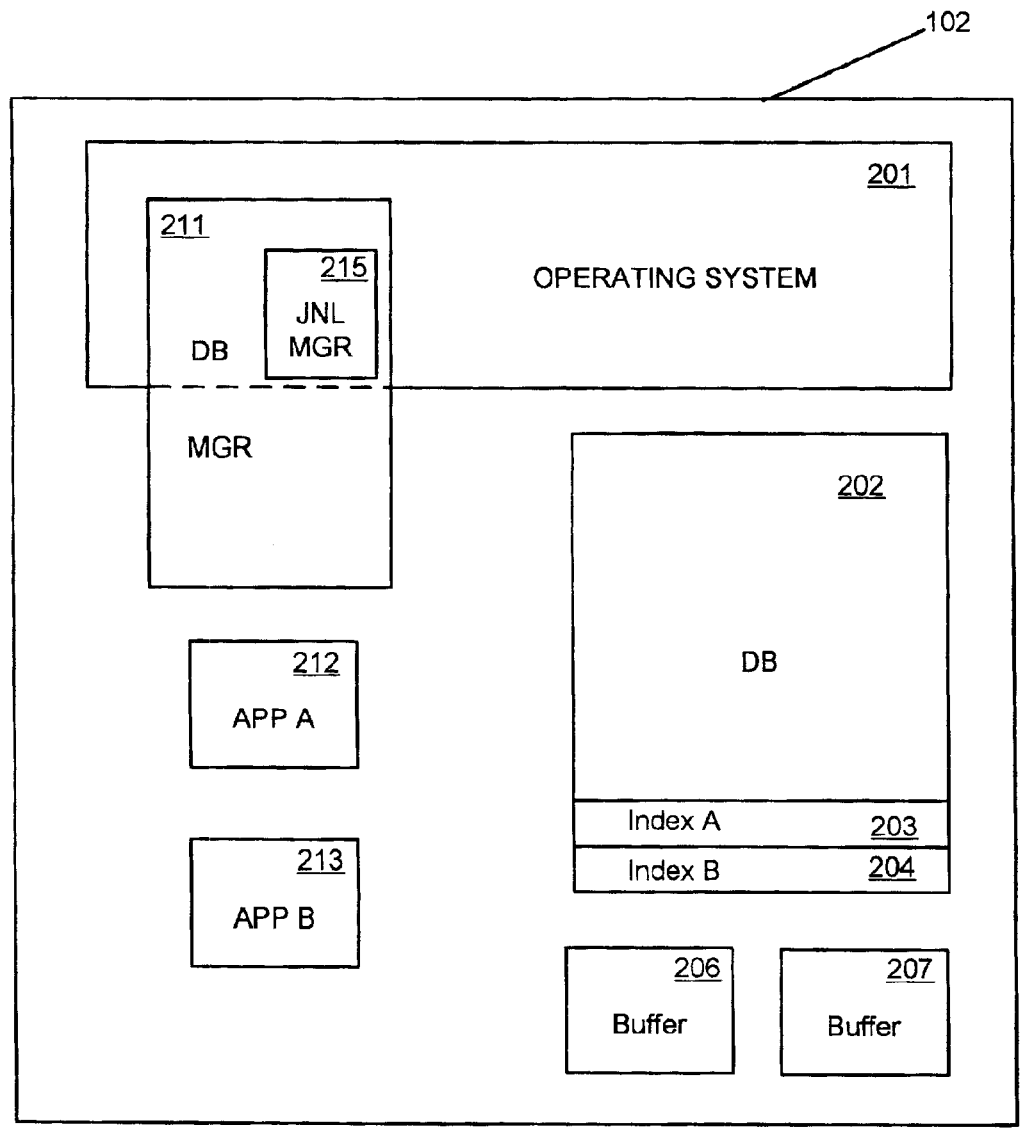
FIG. 2 is a conceptual illustration of the major entities stored in main memory of a computer system supporting database operations, according to the preferred embodiment.

FIG. 2 is a conceptual illustration of the major software components of server system 100 in memory 102. Operating system 201 provides various low-level software functions, such as device interfaces, management of memory pages, management of multiple tasks, etc. as is well-known in the art. A structured database 202 contains data which is maintained by the computer system 100 and for which the system provides access to one or more users, who may be directly attached to system 100 or may be remote clients who access system 100 through a network using a client/server access protocol. Database 202 contains a plurality of records, each record containing at least one (and usually many) fields, as is well known in the art. Database 202 might contain almost any type of data which is provided to users by a computer system. Associated with database 202 are multiple database indexes 203, 204, each index representing an ordering of records in database 202 according to some specified criterion. Access to the data by some of the users might be read-only, but there is at least some capability to update data in the database. Although only one database 202 and two indexes 203, 204 are shown in FIG. 2, the computer system may contain multiple databases, and the number of indexes may vary (and typically is much larger). Alternatively, database 202 on system 100 may be logically part of a larger distributed database which is stored on multiple computer systems.

Database management system 211 provides basic functions for the management of database 202. Database management system 211 may theoretically support an arbitrary number of databases, although only one is shown in FIG. 2. Database management system 211 preferably allows users to perform basic database operations, such as defining a database, altering the definition of the database, creating, editing and removing records in the database, viewing records in the database, defining database indexes, and so forth. It may further contain any of various more advanced database functions. Database management system 211 may be contained entirely within operating system 201, or may be separate from OS 201, or portions of it may be within OS 201 while other portions are separate.

In addition to database management system 211, one or more user applications 212, 213 executing on CPU 101 may access data in database 202 to perform tasks on behalf of one or more users. Such other user applications may include, e.g., word processing, accounting, code development and compilation, mail, calendaring, or any of thousands of user applications. Some of these applications may access database data in a read-only manner, while others have the ability to update data. There may be many different types of read or write database access tasks, each accessing different data or requesting different operations on the data. For example, one task may access data from a specific, known record, and optionally update it, while another task may be in the nature of a query, in which all records in the database are matched to some specified search criteria, data from the matched records being returned, and optionally updated. Furthermore, data may be read from or written to database 202 directly, or may require manipulation or combination with other data supplied by a user, obtained from another database, or some other source. Although two applications 212, 213 are shown for illustrative purposes in FIG. 2, the number of such applications may vary. Applications 212, 213 which access database 202 may utilize operating system function calls to access data in database 202, or may independently access data in database 202.

In the preferred embodiment, database management system 211 includes a journal manager function 215 which handles the journaling of database change operations. Database change entries intended for journaling are assembled for disk write in one or more journal buffers (blocks) 206–207 in memory, from which they are written to disk storage. Although two journal buffer blocks 206–207 are shown in FIG. 2, the number of such buffers may vary. The journal manager handles the writing of database changes to buffers 206–207, and ultimate writing of data in the buffers to journal storage drive 111. The behavior of the journal manager function 215 is described in greater detail herein.

While the software components of FIG. 2 are shown conceptually as residing in memory, it will be understood that in general the memory of a computer system will be too small to hold all programs and data simultaneously, and that information is typically stored in data storage devices 112–115, comprising one or more mass storage devices such as rotating magnetic disk drives, and that the information is paged into memory by the operating system as required. In particular, database 202 is typically much too large to be loaded into memory, and typically only a small portion of the total number of database records is loaded into memory at any one time. The full database 202 is typically recorded in disk storage 112–115.

In accordance with the preferred embodiment of the present invention, the use of journal buffers 206, 207 is dynamically managed so that buffers are selectively emptied depending on the current state of the computer system and the potential recovery time for recovering from loss of certain transactions recorded in the buffer. More specifically, changes to database 202 are placed as entries in journal buffers 206, 207, and ultimately written to journal storage 111 before writing to the database in general data storage 112–115. Buffers 206–207 are emptied upon the occurrence of selected events. Some of these events may be dictated by the user application, and be unrelated to the current system or journal buffer state. Other events are under control of journal manager 215, which may take system and journal state into account to achieve a dynamic balance between competing factors such as system performance, recovery time, data exposed, and so forth. In general, the journal manager will empty the buffers more readily if the system is less busy, and will have a greater tendency to defer emptying the buffers the more busy the system is. This mode of operation is described in greater detail herein with reference to FIGS. 3–5.

Figure 3:
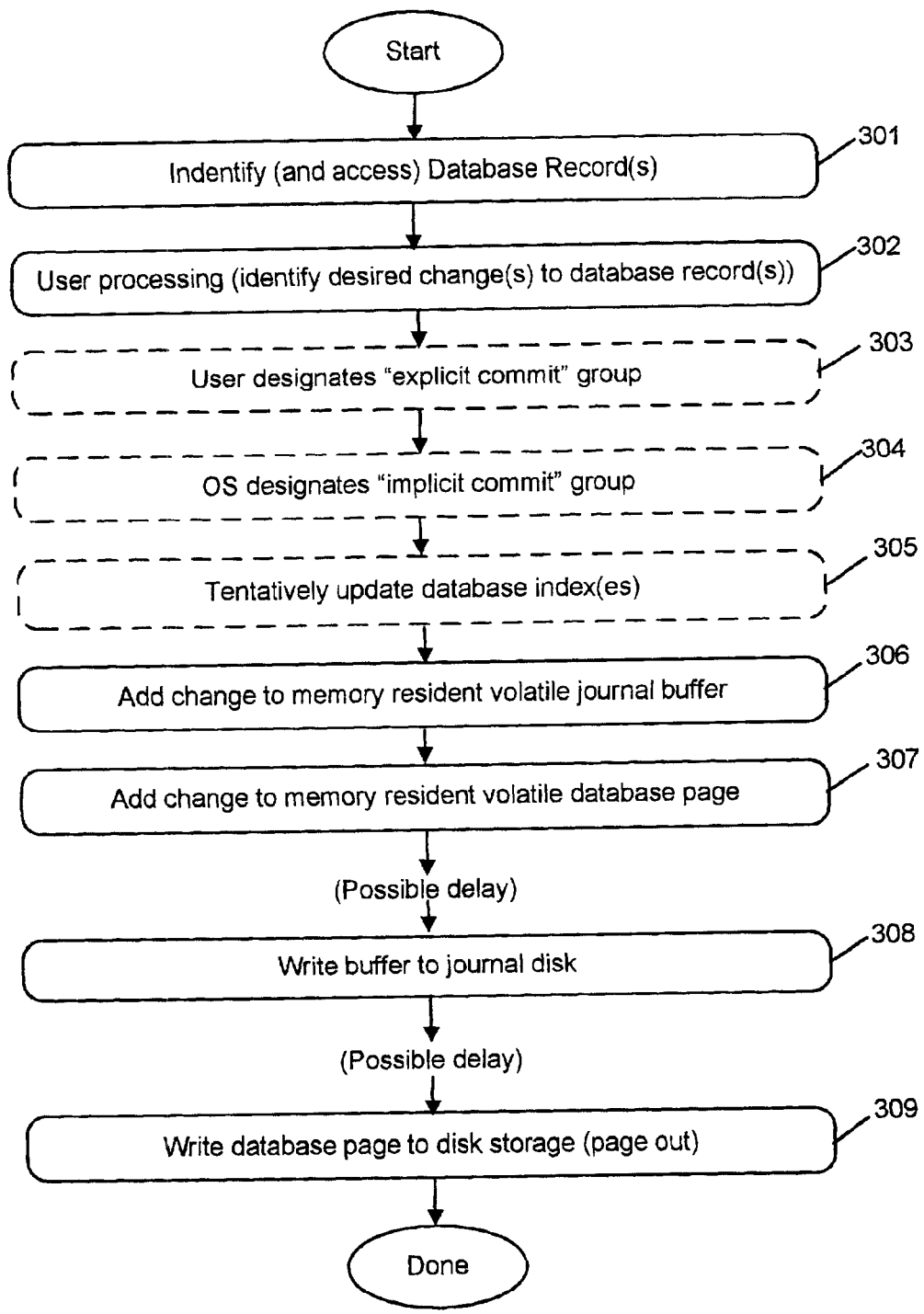
FIG. 3 is a high-level flow diagram illustrating the generalized process of entering a database transaction which causes a change to the database, according to the preferred embodiment.

FIG. 3 is a high-level flow diagram illustrating the generalized process of entering a database transaction which causes a change to the database, according to the preferred embodiment. A typical such database transaction may amount to the creation of one or more new records in the database, a change in one or more fields of one or more existing records in the database, or the deletion of one or more records in the database. A database change may be entered through an application program 212, 213, or through database manager 211. It is also possible to cause database changes in other ways, e.g., by defining new fields, defining new indexes, and so forth, but these changes are less common.

As shown in FIG. 3, a database transaction generally requires that some affected database record or records be identified and accessed (step 301). Where a new record is being created, this may mean nothing more than the generation of a blank record template for receiving data to be input from a user application 212, 213 or database manager 211. In the more common case where one or more existing records are to be modified, this generally means accessing the record(s) from disk storage and loading them into that part of database 202 in memory 102. As is known in the art, identification of a record may involve nothing more than the user input of a field value which uniquely identifies a record, or a selection of a record from a displayed list of records. On the other hand, identification of a record or records may be a far more complex operation, e.g., in which a logical query is formulated and compared to multiple (possibly even all) records in the database in order to find records matching the search criteria of the query. Step 301 is intended to represent any such technique, now known or hereafter developed. Where the number of affected records is small, it is expected that all the records will be loaded into memory 102 for processing; however, some transactions may involve queries so extensive or complex that only a fraction of the affected records is loaded into memory at any one time.

Having identified one or more database records, the identified records are then altered as desired by the user (step 302). Alteration may amount to manual editing of one or more fields, or it may be an automated process in which multiple fields of multiple records are corrected according to some global criteria, or it may be a process in which data is imported into the records from some other source.

A user may optionally specify that one or more changes to one or more database records constitute a transaction which should be "committed" immediately, represented in FIG. 3 as step 303 in dashed outline. Such a group of changes is called an "explicit commit" or a "hard commit". The effect of such a designation, as described more fully herein, is that all changes of the group are committed to the permanent database together, and upon entry or creation of the last of the changes of the group, all of the changes will immediately be written to the disk housing the journal, regardless of the current state of the memory resident journal buffer. A user may wish to specify an explicit commit in order to assure that some set of changes will become part of the permanent database as soon as possible, to reduce the probability of data loss and the need for data re-entry, and/or may wish to guarantee that the changes of a particular set be made as an atomic operation (i.e., either all of the changes become part of the permanent database, or none of the changes become part of the permanent database).

Where the user does not make any explicit commit designation in step 303, a database operating system function may optionally designate one or more changes to one or more database records as an "implicit commit" or "soft commit" group, represented in FIG. 3 as step 304 in dashed outline. An "implicit commit" designation is similar to an "explicit commit" in that all changes of the group will be made atomically, but unlike an explicit commit, an implicit commit may be deferred (will not necessarily be written to journal immediately). In the preferred embodiment, there are at least two reasons why changes may be designated "implicit commit", although it should be understood that, depending on the application, there may be other reasons for using the "implicit commit" technique. A database change need not be part of an explicit commit group or an implicit commit group, i.e., it may be just an isolated write to the database.

Figure 6:
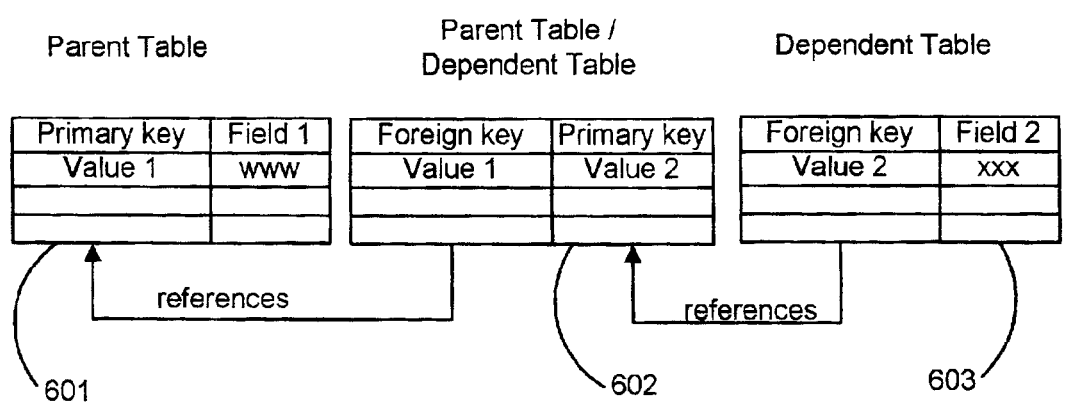
FIG. 6 illustrates an example of a referential integrity problem when updating a database.

The primary reason for using implicit commits is that of referential integrity, i.e., certain changes to different fields in a database are related to each other, such that the data in the database might be corrupted if one of the changes is made part of the permanent database while the other is not. An example of this type of referential integrity is illustrated in FIG. 6. A referential integrity situation may involve an identification number of a particular item which is referenced in more than one table. Constraints may be set up such that when a particular item is deleted from the master item table (e.g, parent table 601), the item will automatically be deleted from other tables 602, 603 in order to maintain integrity between the database tables. It is possible for a resulting delete to cause a delete in another table, resulting in multiple operations. These operations will be performed under an implicit commit cycle in order to allow for the set of operations to be rolled back, if they are only partially committed. This will allow for the sets of deletes to be done atomically in order to guarantee integrity of the database.

An additional reason for using implicit commits is that the changes may be the result of a complex query function requiring actions to many different records, referred to as "SQL [Structured Query Language] atomicity". An example might be a set delete operation affecting 5000 rows in the database, only 50 of which had been completed when processing terminated. In this case, the data would not necessarily be corrupted by making some of the changes and not others, but there could be confusion on behalf of users who believe that a particular global change has been made. The atomicity provided by implicit commit in concert with write ahead journaling eliminates this risk.

Approximately concurrently with steps 306 and 307 (described below), a change may optionally cause one or more database indexes 203, 204 to be tentatively updated as well (step 305). Indexes are updated in main memory, but index updates are not necessarily added to the journal buffers for writing to journal disk 111. It will be observed that indexes represent data which is derived from or compiled from the database itself. As long as the integrity of database records (exclusive of indexes) is maintained, it is always possible to derive the indexes, and therefore journaling of the index updates is not required. However, deriving all the indexes could take considerable time, and under some circumstances it may be desirable to journal the index updates in order to reduce the time required for recovery from a system outage, as described in U.S. Pat. No. 5,574,897 to Hermsmeier et al. and U.S. Pat. No. 5,625,820 to Hermsmeier at al., both of which are herein incorporated by reference. For the same reasons, the exact timing of step 305 is not necessarily critical, and it might be performed before, after or concurrently with other operations depicted in FIG. 3.

The change is then added to one of the journal buffers 206, 207 in volatile main memory. (step 306). Change entries are written sequentially to these journal buffers, in the same format as the change will ultimately be written to the journal disk 111. In practice, journal buffers 206, 207 are typically used in an alternating fashion, i.e., consecutive changes are written to one of the buffers until an event occurs which causes the buffer to be emptied, and then all changes are written to the other buffer. It is possible to allocate more than two buffers, e.g., filling them in a round robin fashion. It is also possible to allocate only a single buffer, such as a circular buffer.

At about the same time, the change is made to the structured database 202 in volatile main memory 102 (step 307). In the preferred embodiment, changes are recorded in the journal buffer before being made to the database in main memory. However, this main memory alteration sequence is not necessarily a requirement for database integrity. In any case, both the addition of a change record to a journal buffer and a change to a record in database 202 involve writes to main memory 102, and occur relatively quickly.

Some time after updating main memory, the change entry is written from a journal buffer 206, 207 to journal disk storage 111 (step 308). There may be a significant time lag before this write begins, or the writing to journal storage may begin almost immediately (although a physical write to a disk storage is a relatively long operation from the standpoint of CPU cycle times, and so there will be some time lag before completion of the journal write). The determination of this time lag, which can vary depending on many factors, is explained more fully herein. After completion of the journal write operation, the journal buffer is re-used, and the change record in the journal buffer is eventually overwritten with unrelated change data.

After completion of the write to the journal disk 111, the change in database 202 is written out to a corresponding address in general data storage 112–115 (step 309). Again, there may be a significant time lag before this write begins, depending on various factors. Often, a database record will remain in main memory until paged out using any of various well known paging schemes. If the record is in a frequently accessed memory page, the record may remain in main memory a very long time without being written to disk storage. In this case, it is not uncommon for a change to a record to be overwritten with subsequent changes to the same record. After writing the record to disk storage, it is deleted from main memory (usually as a result of paging out the page containing the record and overwriting the memory with a different page of storage).

For data integrity purposes, the database record can not be written out to disk storage 112–115 until the change has been written out to journal disk 111. When a change is made to a record (row) of database 202 in main memory (at step 307), the row is "pinned" to temporarily prevent writing (paging out) to disk storage. After the corresponding journal entry for the change has been written to the journal disk (at step 308), the row is "unpinned", allowing it to thereafter be paged out. Unpinning the row does not necessarily cause immediate page out of the page containing the row; it merely releases a temporary hold on paging out.

It will be understood that FIG. 3 is intended as a simplified view of the sequence of certain significant events involved in a typical database transaction, and that other processing (not represented in FIG. 3) is also occurring. The database transaction may be part of a larger user application which processes data from the database and other sources, and changes to the database may be only an incidental part of the function of the application. Additionally, certain bookkeeping activity occurs to assure that writing to memory, journal storage and general disk storage occurs in the proper sequence, and that state variables are maintained from which it would be possible to recover the database contents from journal storage in the event of a system outage before the change is written to general disk storage.

As explained above, the timing of journal writes (step 308) may depend on various factors, although it can be said that journal write necessarily precedes the write of database records to general disk storage (step 309). The journal buffers 206, 207 exist for the purpose of accumulating journal write entries pending a physical write to journal disk 111. Journal manager 215 manages the timing of writes to journal storage 111. In general, the journal manager allows write data to accumulate in a buffer until some condition is satisfied, at which point the buffer is emptied by writing to the journal disk.

Figure 4:
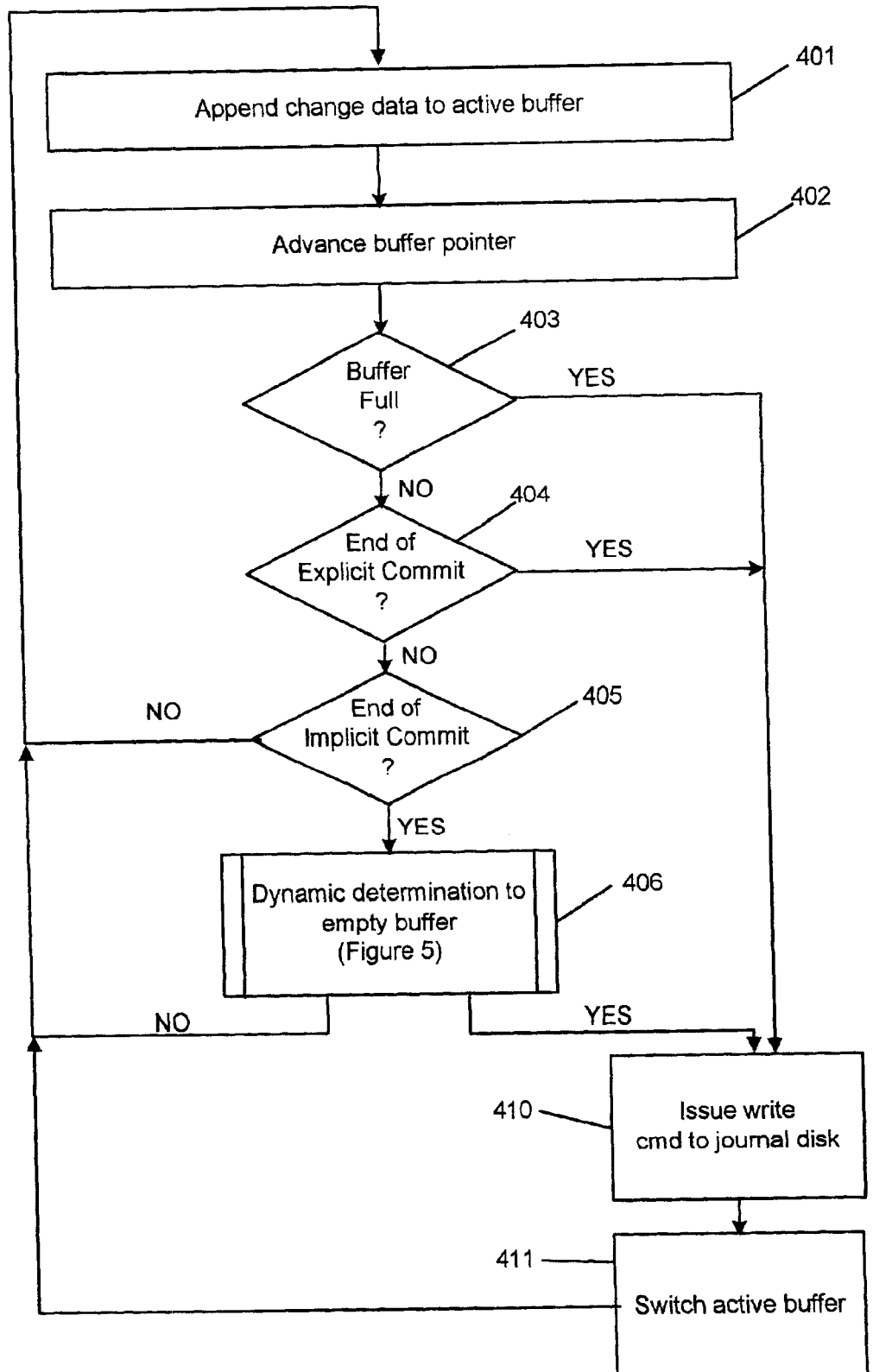
FIG. 4 is a high-level flow diagram illustrating the management of journal buffers for writing to journal storage, according to the preferred embodiment.

FIG. 4 is a high-level flow diagram illustrating the operation of the journal manager function. As explained above with reference to FIG. 3, changes to the database are written to the journal buffer as they are generated by the user application or database manager. One of the journal buffers is the currently active buffer, which receives all current changes. Each individual change entry is appended to the end of the currently active buffer (step 401), and a buffer pointer is incremented to point to the buffer location for writing the next change entry (step 402).

It should be noted that change entries are appended to the buffer in the order in which they are generated by tasks executing on system 100. Since multiple tasks could be concurrently making changes to the database, there is no assurance that all changes made by a particular user, or from a particular commit group (whether an explicit commit or an implicit commit) will be contiguously written to the buffer. In fact, multiple changes generated by a single user are very often interleaved with change entries of other users. Since any individual change entry may cause a buffer to be emptied, it follows that there is also no assurance that all change entries generated by a single user or from a particular commit group will be together in the buffer and written to the journal disk in the same write operation. E.g., it frequently occurs that user A generates some changes as part of a commit group which are written to the buffer, but before A can finish generating all changes of the commit group, user B generates a change entry which causes the buffer to be emptied, and that the remainder of user A's change entries are written to the buffer after user A's earlier changes have already be written to the journal disk.

If, after appending a change entry, the currently active buffer is now full, the "Y" branch is taken from step 403. Each buffer has a maximum size limit. In the preferred embodiment, this maximum size is approximately 128 Kbytes, a size which corresponds approximately to the amount of data written per full revolution of a single track of a disk storage device, it being understood that the maximum size could vary. The maximum size is thus preferably chosen to correspond to an efficient journal write operation. If the buffer has reached this size, further increase in buffer size before emptying the buffer will not necessarily result in any appreciable performance improvement, and so the buffer should be emptied (written to journal disk) in order to both commit certain transactions in the buffer as well as to free up pages of main memory.

If the buffer is not full (the "N" branch from step 403), but the most recently appended change entry is the final change entry of a group of changes specified by the user as an "explicit commit" group, then the "Y" branch is taken from step 404. In this case, the buffer should be emptied immediately in order to comply with the user's explicit commit designation, without waiting for the buffer to fill with additional changes. Emptying the buffer will cause all previously appended change entries of the explicit commit group to be written to the journal, if they have not already been so.

If the most recently appended change entry was not the final change entry of an explicit commit group, then the journal manager considers whether it is a final change entry of an implicit commit group. If not, the "N" branch from step 405 is taken, and the journal manager waits for the next change entry to be added to the journal buffer at step 401. If the change entry was the final change of an implicit commit group, the "Y" branch from step 405 is taken; in this case, the journal manager will consider additional dynamic factors to determine whether or not to empty the buffer. The consideration of these additional dynamic factors is represented in FIG. 4 as step 406, and is illustrated in greater detail in FIG. 5 described below. If the determination of additional factors at step 406 is negative, the journal manager waits for the next change entry to be added to the journal at step 401. If the determination is positive, the journal manager causes the buffer to be emptied at step 410.

If any of various conditions is present which trigger emptying of the buffer, the journal manager issues a write command to the journal disk, causing a direct memory transfer operation of the entire contents of the active journal buffer in memory to the journal disk 111 (step 410). The journal manager also changes the designation of the active journal buffer (step 411); preferably, two journal buffers are used in alternating fashion, although a different number of buffers would be possible. The journal manager then waits for the next change entry to be written to the active buffer at step 401, which will be a buffer other than the one just emptied.

It will be noted that the physical write to journal disk 111 (which commences upon the occurrence of step 410) may take some time, during which any new database change entries will be written to the new active buffer. After the physical write to the journal disk completes, the corresponding database rows in structured database 202 in main memory are "unpinned", indicating eligibility to be written to disk storage.

Figure 5:
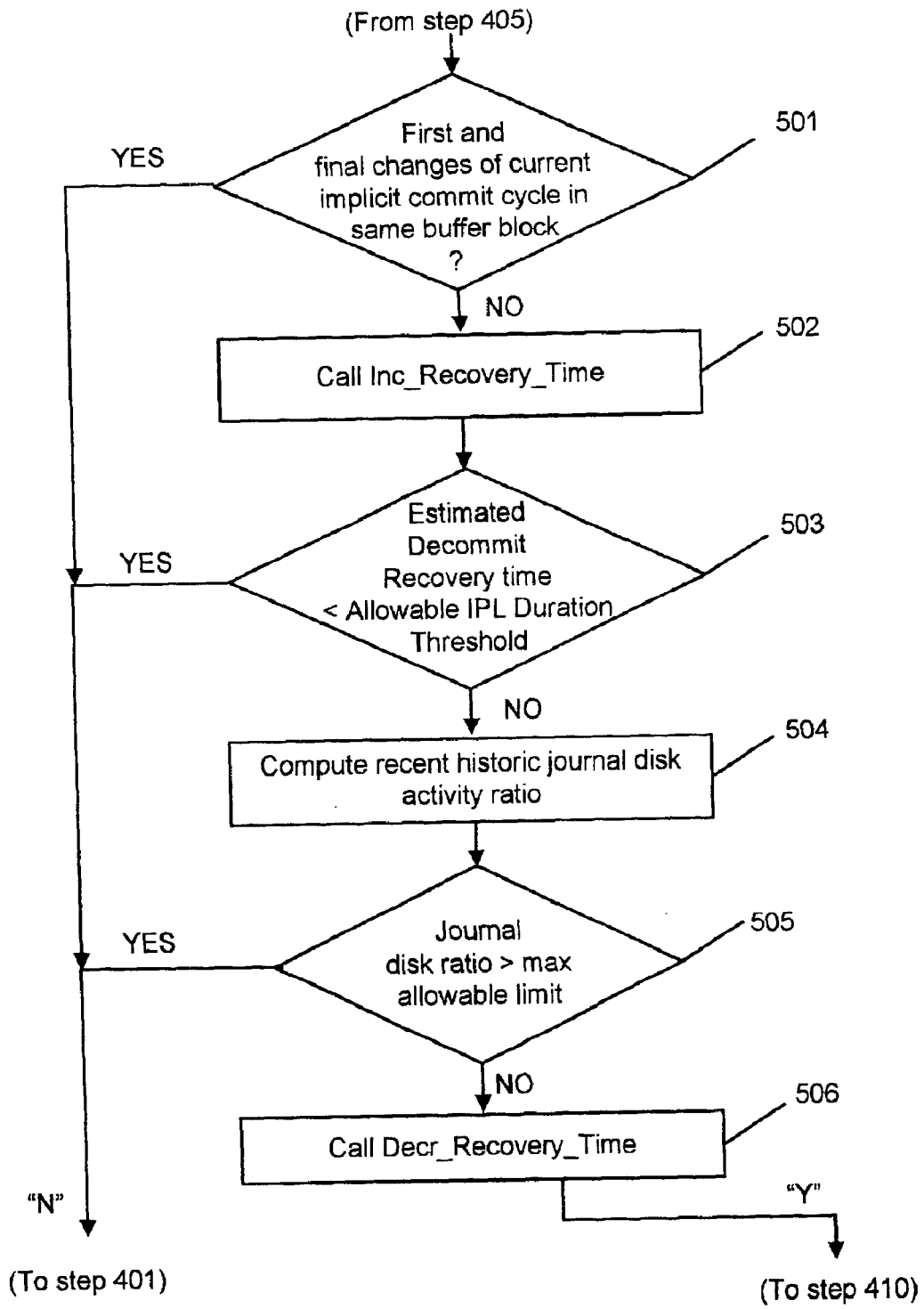
FIG. 5 is a flow diagram illustrating in greater detail the determination made by the journal manager whether to empty the journal buffer based on certain dynamic considerations, according to the preferred embodiment.

FIG. 5 is a flow diagram illustrating in greater detail the determination made by the journal manager whether to empty the buffer when the final change entry of an implicit commit group is appended to the buffer. This determination is based on certain dynamic considerations, i.e., on system state variables which dynamically change. Specifically, the determination takes into account the estimated recovery time as well as the current level of write activity to the journal disk(s).

The journal manager first determines whether the first change entry of the implicit commit group currently resides in the same journal buffer block as the final change entry of the group (step 501). If so, all change entries of the implicit commit group will be written to the journal disk in the same write command, whenever the journal buffer is eventually emptied. In this case, the effect that not committing the transaction to the journal disk immediately would have on elapsed IPL recovery time duration is likely to be small, and the buffer is not emptied (the "Y" branch is taken). If the first change entry resides in a different buffer block, then at least some change entries from this implicit transaction are probably already on the journal disk. This fact indicates a recovery time exposure. I.e., if a system outage were to occur before the final change entry of the implicit commit group can be written to the journal disk, then some entries of the group will have been written to the journal disk while others will not. The unwritten entries will have been lost. Therefore, to preserve the atomicity of the implicit commit group, it would be necessary upon recovery from the outage to "back out" from the database the previously written data in the journal to find all change entries of the implicit commit group, and restore the database to a state without any of the changes made by the implicit commit group. If the span of distance between the first journal entry associated with this implicit commit group and the final journal entry for the same group is wide, then this process can take considerable time at recovery. The journal manager therefore takes the "N" branch to consider whether to empty the buffer immediately in order to reduce recovery time exposure.

If the "N" branch is taken from step 501, the journal manager calls a recovery time increment function to estimate the total system-wide recovery time with the addition of the transaction represented by the change entries of the implicit commit group (step 502). The Inc_Recovery_Time function involves updating estimated values stored in a set of "buckets" which represent the estimated time it will take for each of the system initialization time parallel server tasks (one for each available processor) to perform commit back-out recovery of partially completed (partially written to journal) implicit commit transactions. During such a recovery, all journal entries which are part of the current implicit commit transaction will be scanned from the journal disk. In order to do this, the system will walk the back-chain pointers linking the journal entries representing "before" images. Since these entries are at random locations in the journal disk, it is assumed that one disk access will be needed for each such entry. The total time required to back out of the current implicit commit transaction is therefore estimated as:

$$Num\_entries * Avg\_Jnl\_IO\_Time$$

where Num_entries is the number of entries in this transaction (stored in a field of a commit block data structure associated with the transaction), and Avg_Jnl_IO_Time is the average time for an I/O (disk read) operation in the journal disk(s). While the actual recovery time would also include the time to un-do changes to the records in the structured database, it is assumed that this time is generally overshadowed by the time required for the backward journal scan.

When calculating the system-wide recovery time, it is also necessary to consider other outstanding implicit commit transactions which have not caused the buffer to be emptied. A similar calculation is used for each of these transactions. Because these transactions may be recovered at system initialization in parallel by different initialization server tasks, a set of buckets is created to maintain the recovery time for each task. The outstanding transactions are allocated successively to the various buckets, each successive transaction being allocated to the bucket currently containing the smallest total recovery time. When complete, the estimated system-wide recovery time is the recovery time for the bucket having the largest total recovery time of its components.

Figure 7:
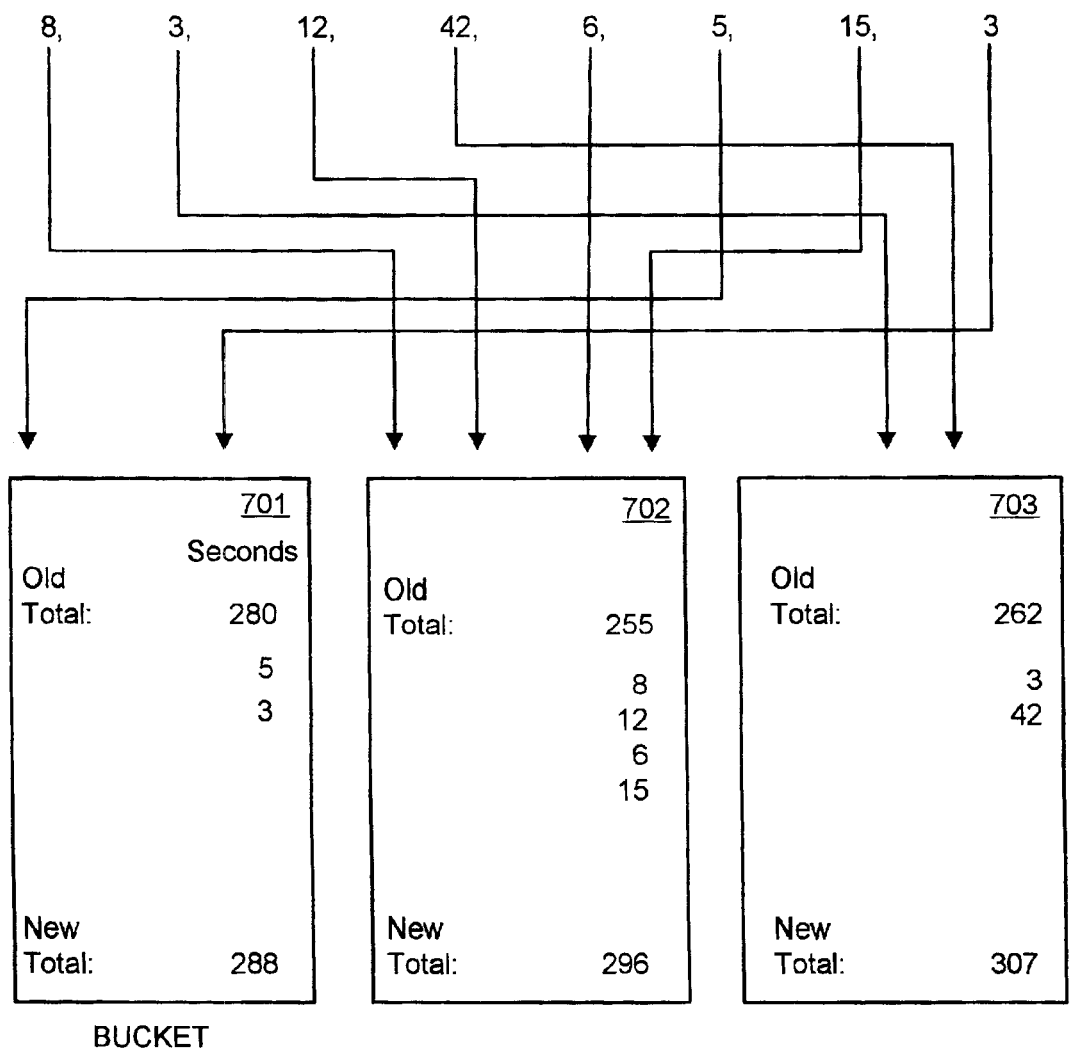
FIG. 7 illustrates an example of a bucket allocation process for estimating total system recovery time at initialization, according to the preferred embodiment.

FIG. 7 illustrates an example of this bucket allocation process. In the example of FIG. 7, there are three buckets 701–703 (corresponding to three parallel CPU tasks at initialization time). When the Inc_Recovery_Time is called, the total recovery times of transactions allocated to the various buckets is 280, 255, and 262 seconds, respectively, meaning that the total system recovery time is deemed to be 280 seconds, corresponding to the estimated time of the largest bucket. Eight additional transactions, having recovery times of 8, 3, 12, 42, 6, 5, 15 and 3 seconds, respectively, are allocated to the buckets. The first transaction, having a recovery time of 8 seconds, is allocated to the bucket having the lowest total recovery time, i.e., bucket 702, having a recovery time of 255 seconds, bringing its total to 263 seconds. The lowest total recovery time is now bucket 703 (262 seconds), so the second transaction, having a recovery time of 3 seconds, is allocated to bucket 703. This process continues, adding the third transaction (12 seconds) to bucket 702, the fourth (42 seconds) to bucket 703, the fifth (6 seconds) to bucket 702, the sixth (5 seconds) to bucket 701, the seventh (15 seconds) to bucket 702, and the eighth (3 seconds) to bucket 701. The bucket totals at the end of this allocation are 288, 296 and 307 seconds, respectively. Therefore, the total recovery time is deemed to be 307 seconds, the time of the largest bucket. It will be observed that this allocation scheme is not necessarily perfectly balanced, but it is simple and achieves an approximate balancing of resources.

If the total system-wide recovery time as updated is less than some pre-determined threshold, then the "Y" branch is taken from step 503 and the buffer is not emptied. In this case, the recovery time exposure is considered too small to justify emptying the buffer. In the preferred embodiment, the threshold is a fixed time period of 10 minutes; however, a different period could be used, and the threshold could be a variable specified by a system administrator. If the total system-wide recovery time exceeds the threshold, it may be desirable to empty the buffer, and the "N" branch is taken from step 503.

The journal manager then makes a calculation of journal disk workload (step 504). In the preferred embodiment, journal disk workload is computed as the ratio:

$$\mathrm{Avg\_Jrn\_IO}/\mathrm{Spec\_Jrn\_IO}$$

where Avg_Jrn_IO is the average number of disk I/O operations per second for the disk(s) containing the journal entries (journal disk(s) 111), computed by dividing the number of I/O operations which have occurred since the last measurement by the time since the last measurement; and where Spec_Jrn_IO. is the specification disk bandwidth for the disk(s) containing the journal entries, i.e. the number of I/O operations per second which can be handled according to the disk specification.

If the ratio computed in step 504 is greater than a prespecified limit (which is preferably 80%), then the "Y" branch is taken from step 505 and the buffer is not emptied. In this case, the journal disk is currently very busy servicing essential work. To empty a buffer which is not yet full could adversely affect performance. If the ratio is not more than 80%, the "N" branch is taken from step 505 to empty the buffer.

If the "N" branch is taken from step 505 (buffer to be emptied), the journal manager calls a recovery time decrement function to decrement the system-wide recovery time, so that the changes which were part of the outstanding implicit commit group (and any other outstanding groups which will be finally committed to journal by emptying the currently active buffer) will no longer be considered part of the estimated recovery time (step 506).

Referring above to the procedure for incrementing the estimate of system-wide recovery time, this estimate is decremented by first removing from each bucket the implicit commit transactions which will be completed by emptying the currently active journal buffer block. This may cause the buckets to become unbalanced. To re-balance the buckets, it would be possible to re-allocate the recovery times from scratch. However, in the preferred embodiment, a simpler and faster procedure is used. Starting with the bucket containing the maximum recovery time, the smallest transaction time is transferred from this (donor) bucket to the (recipient) bucket having the minimum recovery time, if, after the transfer, the recipient bucket will still have a lower total recovery time than the recovery time of the donor bucket before the transfer. This process repeats until the condition for transfer can no longer be satisfied. The new system-wide recovery time is the total recovery time of the bucket having the largest total recovery time.

The algorithms described above for selectively triggering the emptying of the journal buffer are intended to cope with an environment in which there is a relatively high sustained rate of journal entries arriving in the buffer. In an environment in which there is a very low level of database update activity, it may take a long time to fill a journal buffer block, and it is therefore possible that some entries may remain uncommitted to the journal disk long after they are generated by the user application. To deal with this low activity environment and assure that the buffer contents don't become overly stale, the journal manager preferably includes a sweep task which periodically wakes up and flushes the contents of a buffer block which has not been flushed since the sweep task previously executed. It will be appreciated that alternative algorithms or techniques may be employed to accomplish the same purpose.

It will be understood that many variations are possible in the steps and formulae described above for using dynamic factors to determine when to empty the journal buffer. In the preferred embodiment, the activity of the system is measured as a ratio of actual journal I/O to specified capacity, but different parameters and/or formulae might alternatively be used. For example, one might instead measure the length of a backlog or queue of pending I/O operations to the journal disk, or one might elect to take into account the total quantity of main memory consumed by "pinned" database pages.

Similarly, in the preferred embodiment, an estimate of total system recovery time is made using buckets as an initial threshold inquiry. However, different determinations might be made which do not require an estimate of total system recovery time. E.g., one might estimate recovery time applicable to the current implicit commit transaction, or simply use a number of journal entries in the current implicit commit transaction as a threshold (which is, in general, related to the recovery time, although not a direct measure of recovery time). Additionally, many alternative methods might be used for estimating either total system recovery time or recovery time applicable to some subset of transactions, or using some other parameters which are in some way related to recovery time. Finally, the way in which these factors are compared might be altered. For example, rather than sequentially compare recovery time to a fixed threshold, and then compare disk 10 to a fixed threshold, both of these factors, or other or additional factors, might be included in a mathematical evaluation function which would provide a single quantitative measure of the desirability of emptying the buffer.

In general, the routines executed to implement the illustrated embodiments of the invention, whether implemented as part of an operating system or a specific application, program, object, module or sequence of instructions may be referred to herein as "computer programs" or simply "program". The computer programs typically comprise instructions which, when read and executed by one or more processors in the devices or systems in a computer system consistent with the invention, cause those devices or systems to perform the steps necessary to execute steps or generate elements embodying the various aspects of the present invention. Moreover, while the invention has and hereinafter will be described in the context of fully functioning computer systems, the various embodiments of the invention are capable of being distributed as a program product in a variety of forms, and the invention applies equally regardless of the particular type of signal-bearing media used to actually carry out the distribution. Examples of signal-bearing media include, but are not limited to, recordable type media such as volatile and non-volatile memory devices, floppy disks, hard-disk drives, CD-ROM's, DVD's, and magnetic tape. Examples of signal-bearing media are illustrated in FIG. 1 as main memory 102 and as storage devices 111–115.

In the description above, data which is the subject of journaling has been described as maintained in a structured "database". The use of this term is not meant to imply any limitations on the character or structure of the data, and the present invention may apply to any form of data, whether or not the data is referred to as a "database".

In the preferred embodiment described above, the computer system utilizes an IBM AS/400 or I/Series architecture. It will be understood that certain implementation details above described are specific to this architecture, and that database management mechanisms in accordance with the present invention may be implemented on different architectures, and certain implementation details may vary.

While the invention has been described in connection with what is currently considered the most practical and preferred embodiments, it is to be understood that the invention is not limited to the disclosed embodiments, but on the contrary, is intended to cover various modifications and equivalent arrangements included within the spirit and scope of the appended claims.

What is claimed is:

1. A method for managing data in a computer system, comprising the steps of:

entering data changes in a journal buffer, said journal buffer being in volatile memory of said computer system;

selectively determining whether to write contents of said journal buffer to a non-volatile journal storage, said selectively determining step using at least one dynamic selection criterion to selectively determine whether to write contents of said journal buffer to said journal storage device when said journal buffer is not filled to maximum capacity, wherein said at least one dynamic selection criterion comprises at least one criterion relating to time to recover incomplete journal transactions; and writing contents of said journal buffer to said non-volatile journal storage responsive to the result of said selectively determining step.

2. The method for managing data of claim 1, wherein said non-volatile journal storage comprises at least one rotating magnetic hard disk drive storage device.

3. The method for managing data of claim 1, wherein said at least one dynamic selection criterion comprises a measurement of current activity level of at least one component of said computer system.

4. The method for managing data of claim 3, wherein said at least one dynamic selection criterion comprises a measurement of current activity level of said non-volatile journal storage.

5. The method for managing data of claim 1, wherein said at least one dynamic selection criterion comprises an estimate of time to recover incomplete journal transactions.

6. The method for managing data of claim 5, wherein said estimate of time to recover incomplete journal transactions comprises allocating incomplete journal transactions to a plurality of buckets corresponding to recovery tasks according to a balancing algorithm to determine a respective recovery time for each bucket, and estimating time to recovery of said computer system as the recovery time of the individual bucket of said plurality of buckets having the largest recovery time.

7. The method for managing data of claim 1, wherein said selectively determining step comprises:

identifying a plurality of commit transactions, each commit transaction containing a respective discrete set of said data changes entered in said journal buffer;

identifying a respective final data change of each of a plurality of commit transactions;

triggering said selective determination whether to write contents of said journal buffer to a non-volatile journal storage responsive to identifying a respective final data change of each of a plurality of commit transactions.

8. The method for managing data of claim 7, wherein some of said commit transactions are explicitly identified as commit transactions by a user, and some of said commit transactions are implicitly identified as commit transactions by a managing function executing on said computer system, said step of triggering said selective determination whether to write contents of said journal buffer to a non-volatile journal storage being performed responsive to identifying a respective final data change of an implicitly identified commit transaction.

9. A program product for managing data in a computer system, said program product comprising a plurality of processor executable instructions recorded on recordable type media, wherein said instructions, when executed by at least one central processor of said computer system, cause the system to perform the steps of:

entering data changes in a journal buffer, said journal buffer being in volatile memory of said computer system;

selectively determining whether to write contents of said journal buffer to a non-volatile journal storage, said selectively determining step using at least one dynamic selection criterion to selectively determine whether to write contents of said journal buffer to said journal storage device when said journal buffer is not filled to maximum capacity, wherein said at least one dynamic selection criterion comprises an estimate of time to recover incomplete journal transactions; and writing contents of said journal buffer to said non-volatile journal storage responsive to the result of said selectively determining step.

10. The program product of claim 9, wherein said non-volatile storage comprises at least one rotating magnetic hard disk drive storage device.

11. The program product of claim 9, wherein said at least one dynamic selection criterion comprises a measurement of current activity level of at least one component of said computer system.

12. The program product of claim 11, wherein said at least one dynamic selection criterion comprises a measurement of current activity level of said non-volatile journal storage.

13. The program product of claim 9, wherein said estimate of time to recover incomplete journal transactions comprises allocating incomplete journal transactions to a plurality of buckets corresponding to recovery tasks according to a balancing algorithm to determine a respective recovery time for each bucket, and estimating time to recovery of said computer system as the recovery time of the individual bucket of said plurality of buckets having the largest recovery time.

14. The program product of claim 9, wherein said selectively determining step comprises:

identifying a plurality of commit transactions, each commit transaction containing a respective discrete set of said data changes entered in said journal buffer;

identifying a respective final data change of each of a plurality of commit transactions;

triggering said selective determination whether to write contents of said journal buffer to a non-volatile journal storage responsive to identifying a respective final data change of each of a plurality of commit transactions.

15. The program product of claim 14, wherein some of said commit transactions are explicitly identified as commit transactions by a user, and some of said commit transactions are implicitly identified as commit transactions by a managing function executing on said computer system, said step of triggering said selective determination whether to write contents of said journal buffer to a non-volatile journal storage being performed responsive to identifying a respective final data change of an implicitly identified commit transaction.

16. A computer system, comprising:

at least one processing unit;

a non-volatile data storage comprising at least one non-volatile data storage device, a portion of said non-volatile data storage being used as a journal;

a volatile memory for storing instructions executable on said at least one processing unit and for storing a journal buffer containing changes to data stored in said non-volatile data storage;

a manager which selectively determines whether to write contents of said journal buffer to said journal portion of said non-volatile data storage, said manager using an least one dynamic selection criterion to selectively determine whether to write contents of said journal buffer to said journal when said journal buffer is not filled to maximum capacity, said at least one dynamic selection criterion comprising at least one criterion relating to time to recover incomplete journal transactions, said manager causing journal buffer contents to be written to said journal portion of said non-volatile data storage responsive to the result of said selective determination.

17. The computer system of claim 16, wherein said non-volatile data storage comprises a plurality of independently accessible data storage devices, and wherein said journal portion of said non-volatile data storage is a subset of said plurality of independently accessible data storage devices.

* * * * *